United States Patent [19]

Atwood

[11] Patent Number: 4,932,477
[45] Date of Patent: Jun. 12, 1990

[54] AGRICULTURAL ROLLER WITH RESILIENT TREADS

[76] Inventor: Ruben L. Atwood, Rte. 1 Box 361, Rileyville, Va. 22650

[21] Appl. No.: 382,309

[22] Filed: Jul. 20, 1989

Related U.S. Application Data

[63] Continuation of Ser. No. 245,022, Sep. 16, 1988, abandoned.

[51] Int. Cl.$^5$ .............................................. A01B 29/04
[52] U.S. Cl. ..................................... 172/519; 404/124
[58] Field of Search ............... 172/519, 537, 539, 518, 172/568, 535, 604; 404/124, 128

[56] References Cited

U.S. PATENT DOCUMENTS

| | | | |
|---|---|---|---|
| 1,645,994 | 10/1927 | Lloyd | 172/537 |
| 2,114,140 | 4/1938 | Grundeman | 172/537 |

FOREIGN PATENT DOCUMENTS

| | | | |
|---|---|---|---|
| 3539821 | 5/1987 | Fed. Rep. of Germany . | |
| 45104 | 10/1917 | Sweden . | |
| 156109 | 9/1956 | Sweden . | |
| 739871 | 11/1955 | United Kingdom | 172/519 |

OTHER PUBLICATIONS

Farm Show, vol. 8, No. 5, 1984 "Tire Cultipacker", p. 6.

Primary Examiner—Richard J. Johnson
Attorney, Agent, or Firm—Lowe, Price, LeBlanc, Becker & Shur

[57] ABSTRACT

An agricultural roller is disclosed that permits rocks and other obstructions to be compacted into soil. and especially sod fields. In particular, the disclosed agricultural roller employs a pipe on which a plurality of rubber treads are mounted. The substantially solid treads insure that the full weight of the roller is applied to obstructions to press rocks and other obstructing objects into the soil, while at the same time permitting the roller to be towed in the field and on roads at increased speeds as compared with steel rollers. A tongue hitch is also provided to permit easy servicing of the treads.

3 Claims, 3 Drawing Sheets

AGRICULTURAL ROLLER WITH RESILIENT TREADS

CROSS REFERENCE TO RELATED APPLICATION

This is a continuing application of, and claims priority from, U.S. Ser. No. 07/245,022, filed Sept. 16, 1988, aband. entitled "Agricultural Roller".

BACKGROUND OF THE INVENTION

The present invention is directed to an agricultural roller. More specifically, the present invention is directed to an agricultural roller that compacts objects into the soil to prevent damage to agricultural equipment such as haybines and the like.

Agricultural rollers have been used for many years to primarily compact tilled soil to prevent wind erosion and loss of moisture content. Conventional rollers are primarily constructed of a steel tube or pipe that is provided with a hitch mechanism so that the roller can be towed by a tractor. One of the primary disadvantages of a steel roller, however, is the relatively slow speed at which a steel roller can be towed. This is of special concern when attempting to economically move the roller between fields on paved roads at tractors speeds, which today average better that 20 mph.

Efforts have been made to overcome the disadvantages of steel rollers, for example, by mounting nonpressurized truck tires on a pipe that acts as a rim for the tires. The pipe can be filled with a ballast material, such as sand or water, to increase the weight of the roller. Alternatively, the tires themselves are filled with concrete or the like to increase the overall weight of the roller. Filling the tires with concrete, however, is not particularly desirable as this makes it difficult to replace a tire when worn, i.e., the entire tire and ballast must be discarded. Examples of such tire rollers, which are primarily intended for use on tilled fields, are described in an article entitled, "Look What They're Doing with Old Tires", Farm Show, Vol. 8, No. 5, 172–537, 1984.

While the above-described tire rollers overcome some of the deficiencies associated with steel rollers, they are not particularly suited for use in compacting rocky fields, and especially sod fields, such that rocks and other obstructions are pressed into the soil to prevent damage to other agricultural equipment, such as haybines, which subsequently pass over the field. The non-pressurized tires generally employed on the tire rollers, however, are flexible and have a tendency to roll over rocks and other obstructions without pressing the obstructions into the ground. Accordingly, it would be desirable to provide an agricultural roller capable of compacting rocks and other obstructions that did not suffer from the deficiencies of conventional agricultural rollers as described above.

SUMMARY OF THE INVENTION

The present invention provides an agricultural roller that permits rocks and other obstructions to be compacted into soil, and especially sod fields, without the above-described deficiencies of steel rollers and tire rollers. In particular, the present invention provides an agricultural roller that employs a pipe on which a plurality of treads are mounted. The substantially solid treads insure that the full weight of the roller is applied to obstructions to press rocks and other obstructing objects into the soil, while at the same time permitting the roller to be towed in the field and on roads at increased speeds as compared with steel rollers. A tongue hitch is also provided to permit easy servicing of the treads.

BRIEF DESCRIPTION OF THE DRAWINGS

With the above as background, reference should now be made to the following description of the preferred embodiments in conjunction with the drawings for a more detailed explanation of the invention, in which.

DETAILED DESCRIPTION OF THE PREFERRED EMBODIMENTS

Figure 1:
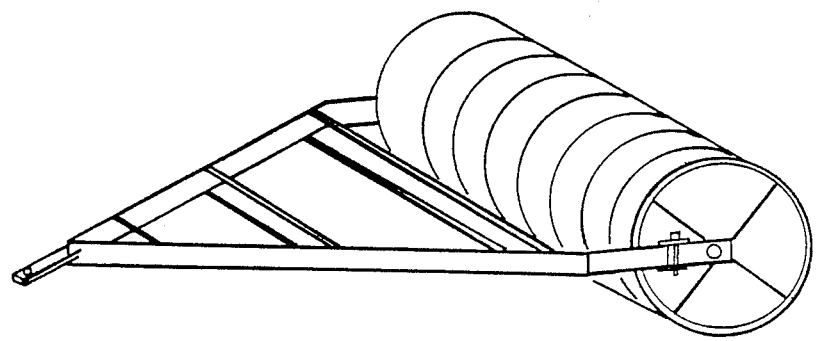
FIG. 1 illustrates a perspective view of an agricultural roller according to the invention.

Referring now to FIG. 1, an agricultural roller according to the present invention is shown having a plurality of rubber treads 8 mounted on a metal roller or pipe 1. The pipe 1 is coupled to a tongue hitch 5 and tongue 10 via axle assembly 2 which is shown in greater detail in FIG. 4. A side view and perspective view of the end of the agricultural roller are respectively provided in FIGS. 2 and 3.

Figure 4:
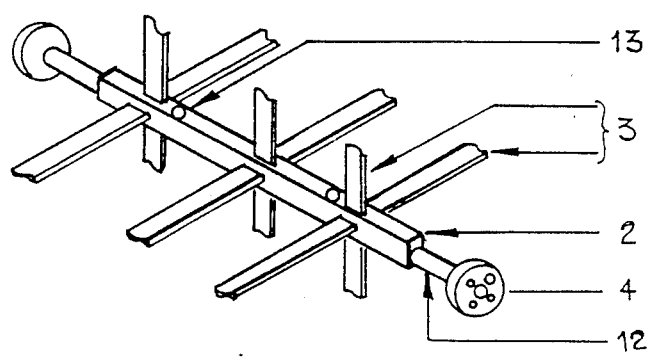
FIG. 4 illustrates an axle assembly employed in the agricultural roller illustrated in FIG. 1.

The pipe 1 preferably consists of a steel pipe 7/16 inches thick and 36 inches in diameter which is mounted on the axle assembly 2. The axle assembly 2 preferably includes two 2½ inch angle irons ⅜ inches thick and 11 feet in length that are welded together to form a square as illustrated in FIG. 4. Prior to the welding of the angle irons, however, short hub axles 12, preferably 1 15/16 inch in diameter and having a hub 4 at an end thereof, are placed inside the angle irons and secured in place with two machine bolts 13. Pipe supports 3, which preferably are constructed of flat stock ½ inch thick, 10 inches wide and approximately 16¼ inch long are welded into place at the ends and center of the axle assembly 2. The axle 2 assembly is then slid into the pipe 1 and the pipe supports 3 are welded to the pipe 1.

Figure 2:
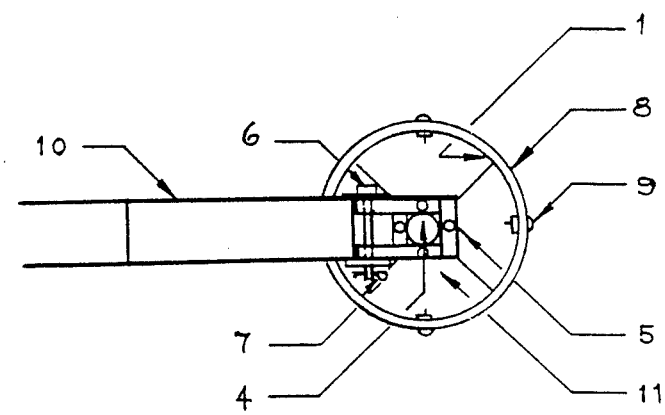
FIG. 2 illustrates a side view of the roller shown in FIG. 1.
Figure 3:
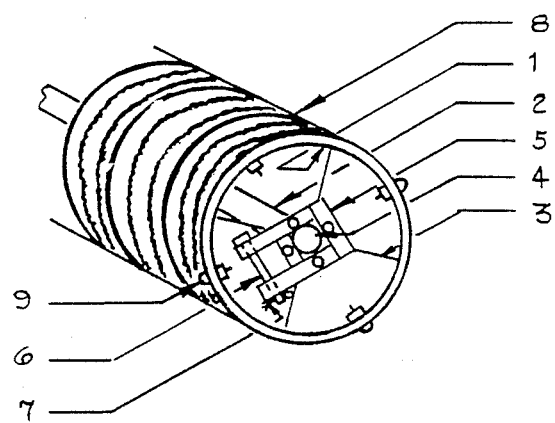
FIG. 3 illustrates a perspective view of one end of the roller illustrated in FIG. 1.
Figure 5A:
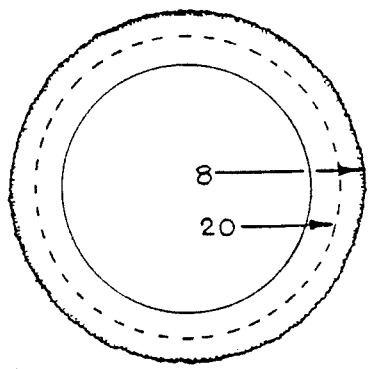
FIGS. 5A and 5B illustrate where the sidewall of a used tire is cut to produce a tread employed on the roller of FIG. 1.
Figure 5B:
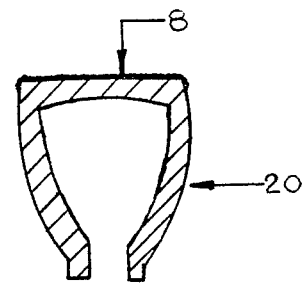

The rubber treads 8 are preferably constructed by cutting out the sidewalls of used 900-20 truck tires which can be accomplished, for example, by the use of a chain saw. The dotted lines in FIGS. 5A and 5B illustrate the point at which the sidewalls 20 are cut. The treads 8 are slipped onto the pipe 1. More specifically, the treads 8 are mounted substantially flush on the roller surface with a tire iron and slid into position tapping with a heavy hammer. This can be accomplished by jacking up one end of the pipe 1 at a time and placing a block under the pipe 1 to lift the end of the pipe 1 from the ground. In a preferred embodiment, a total of seventeen tire treads are employed and are held in place by securing one tread 8 at each end of the pipe with four bolts 9 as shown in FIG. 2. It will be readily understood that while used tires are employed as a source of the treads 8, new treads specifically manufactured for use on the roller may also be employed.

As shown in FIG. 2, a tongue hitch 5, one on each side of the roller, is bolted to the hub 4 of the axle 2. The tongue hitch 5 is preferably constructed of two inch angle iron welded together and bolted to the hub 4. The tongue 10 is then attached to the tongue hitch 5 via pin 6 and secured with cotter key 7. The provision for the tongue hitch permits the quick and easy replacement of treads 8 when necessary. This is particularly advantageous as many conventional rollers require that a hub or bearings be removed in order to service the roller. With the tongue hitch it is only necessary to remove the pins 6 to service the roller.

Concrete can be poured inside the pipe 1 to provide additional weight if desired. With the above-described dimensions, the roller can be easily adjusted to weigh between 1½ to 7 tons with the addition of concrete ballast.

The above-described agricultural roller is especially useful in preparing rocky soil by pressing rocks and other obstructions into the soil. The roller also levels and compresses the soil for better germination of seeds after planting and for preparing cloddy and rocky soil for planting. The roller also significantly improves the speeds at which agricultural equipment can move across the field by removing obstructions, thereby providing an economic benefit to farmers. For example, hay fields that were previously limited to a haybine speed of not more than two miles per hour can now be cut at speeds greater than four miles per hour or as fast as the haybine is capable of cutting. The roller is also capable of moving at speeds of about 20 mph over road surfaces, significantly reducing the time required to move the roller from field to field as compared with steel rollers.

The invention has been described with reference to certain preferred embodiments thereof. It will be understood, however, that modifications and variations may be made within the spirit and scope of the appended claims. For example, other dimensions and materials may be employed other than those listed above. In particular, rubber treads particularly manufactured for use on the disclosed roller may be employed instead of used tire treads.

I claim:

1. An agricultural roller comprising a tube coupled to an axle assembly and a plurality of rubber treads mounted on and extending across the outside surface of said tube, wherein said rubber treads are substantially flat and the undersurfaces thereof are substantially flush with said outside surface of said tube, whereby the outer surface of said agricultural roller is substantially rigid.

2. An agricultural roller as claimed in claim 1, further comprising a tongue hitch coupled to said axle assembly.

3. An agricultural roller as claimed in claim 1, wherein a ballast material is provided within said tube.

* * * * *